(No Model.) 7 Sheets—Sheet 1.

W. C. FAWKES.
EXHIBITING DEVICE.

No. 522,979. Patented July 17, 1894.

Witnesses
Frank L. Stevens,
Ambrose Risdon

Inventor:
Wilbert C. Fawkes
By Cyrus Kehr
Atty

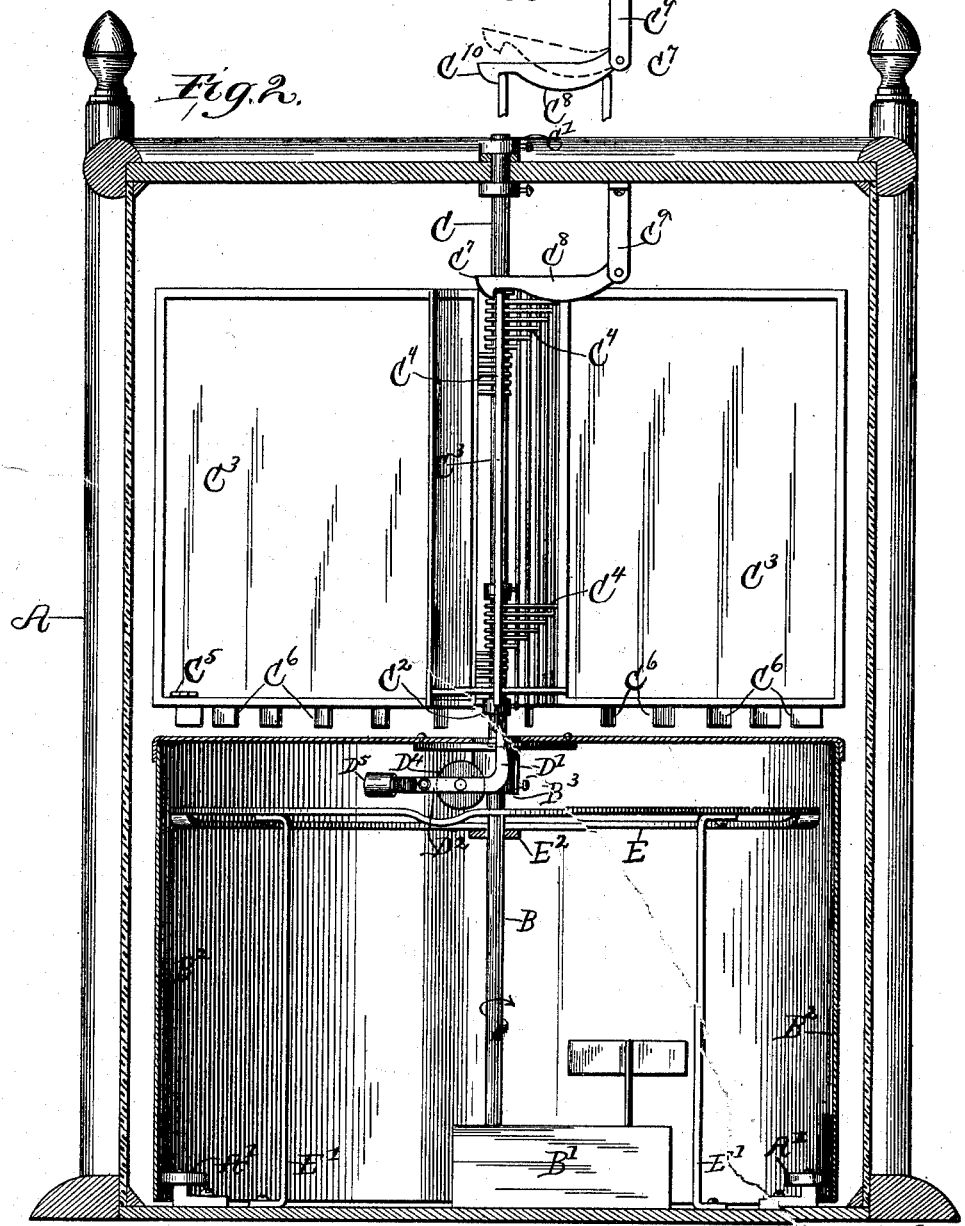

(No Model.)  7 Sheets—Sheet 3.
W. C. FAWKES.
EXHIBITING DEVICE.
No. 522,979.  Patented July 17, 1894.
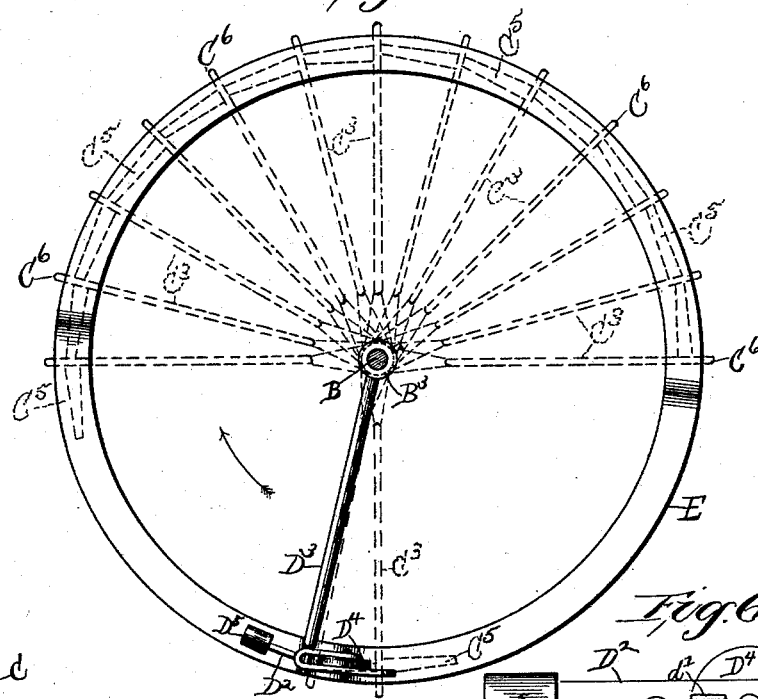
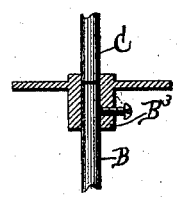
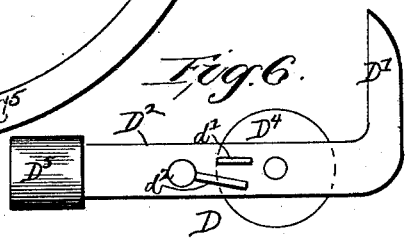
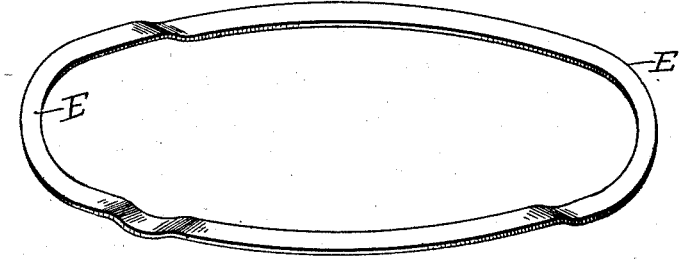
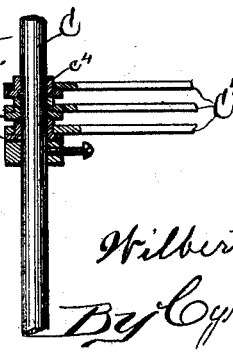
Witnesses:
Frank L. Stevens,
Ambrose Risdon
Inventor
Wilbert C. Fawkes
By Cyrus Kehr Atty

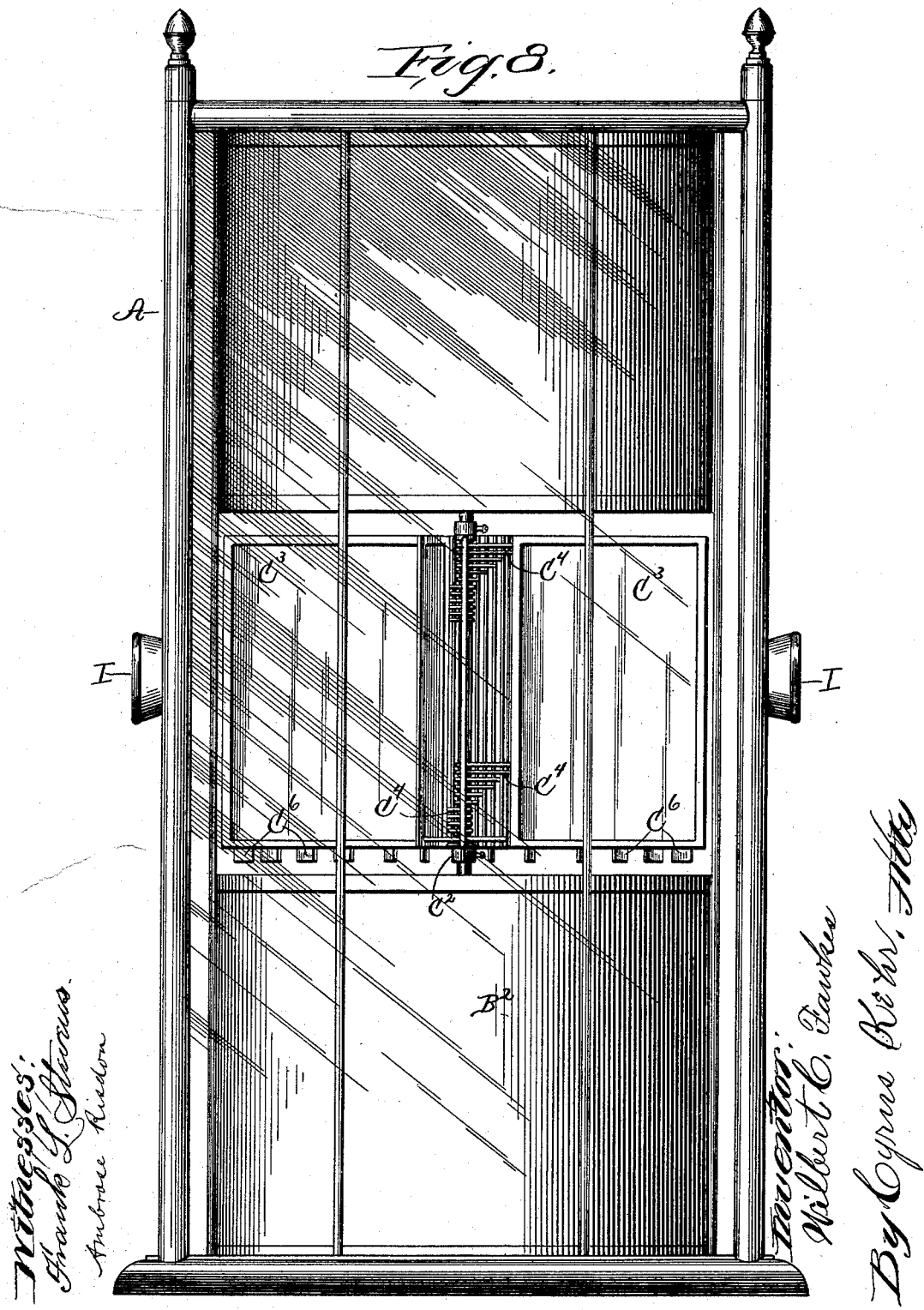

(No Model.) 7 Sheets—Sheet 5.
W. C. FAWKES.
EXHIBITING DEVICE.
No. 522,979. Patented July 17, 1894.
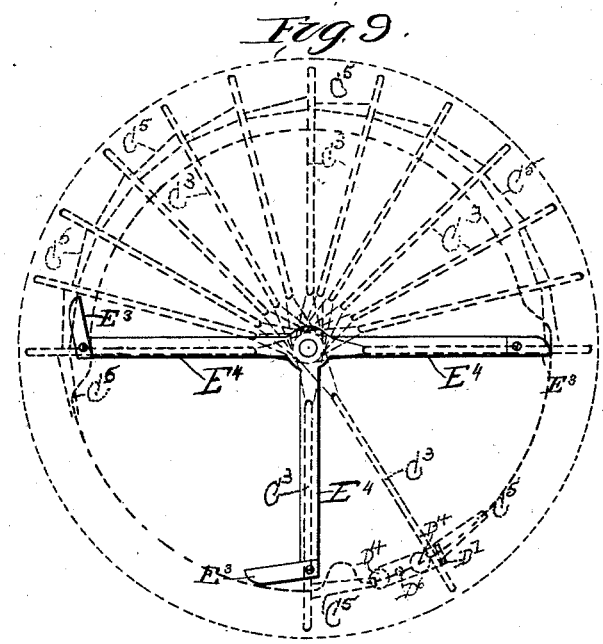
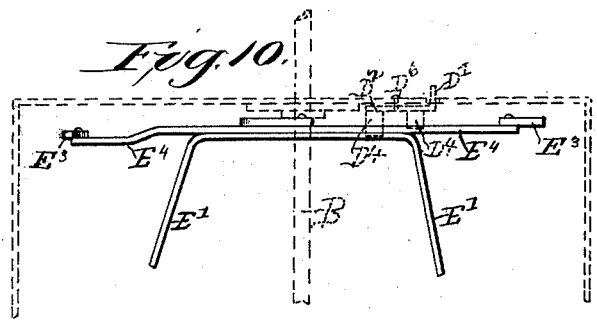
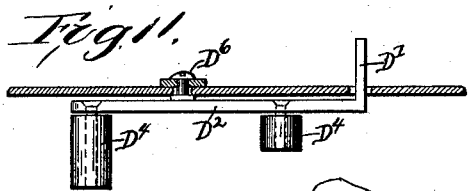
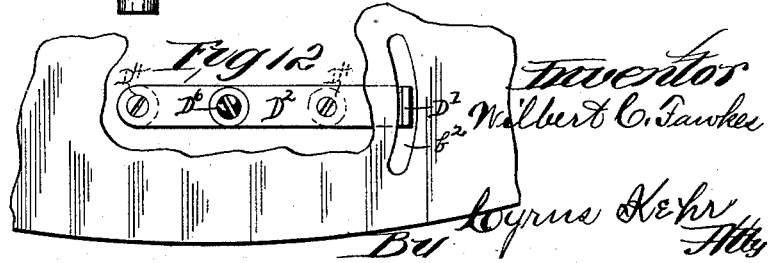

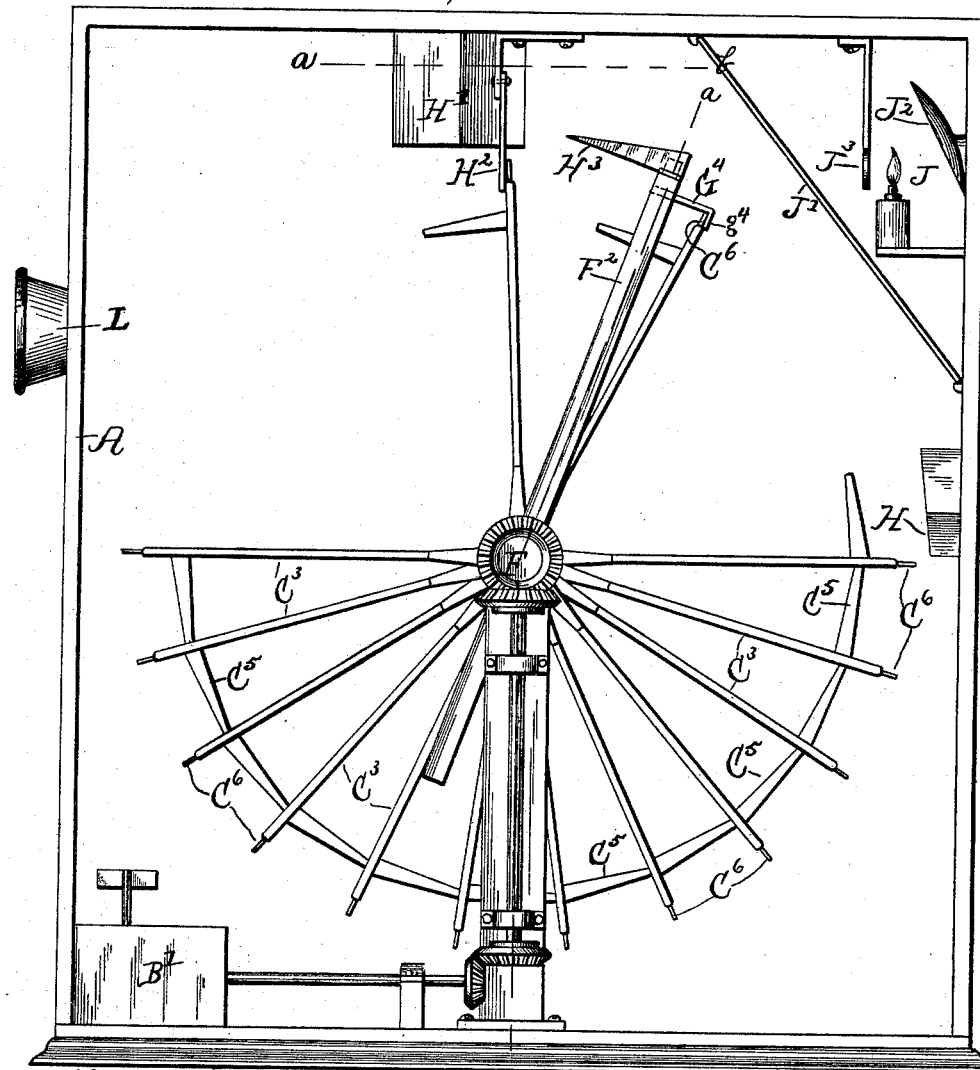

(No Model.) 7 Sheets—Sheet 7.

W. C. FAWKES.
EXHIBITING DEVICE.

No. 522,979. Patented July 17, 1894.

Witnesses
Frank L. Stevens
Ambrose Risdon

Inventor:
Wilbert C. Fawkes
By Cyrus Kehr
Atty

THE NORRIS PETERS CO., PHOTO-LITHO., WASHINGTON, D. C.

UNITED STATES PATENT OFFICE.

WILBERT C. FAWKES, OF CHICAGO, ILLINOIS.

EXHIBITING DEVICE.

SPECIFICATION forming part of Letters Patent No. 522,979, dated July 17, 1894.

Application filed December 26, 1891. Renewed June 6, 1894. Serial No. 513,705. (No model.)

*To all whom it may concern:*

Be it known that I, WILBERT C. FAWKES, a citizen of the United States, residing at Chicago, in the county of Cook and State of Illinois, have invented certain new and useful Improvements in Exhibiting Devices; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My improvement relates broadly to devices used for exhibiting printed, written, and pictorial matter, as well as articles of merchandise.

The device comprises primarily, first a series of wings for bearing printed, written, or pictorial matter, or articles of merchandise, and second mechanism for revolving and successively exposing the faces of said wings to view.

The device may comprise, secondarily, a rotary drum inclosing mechanism for actuating said wings and itself, the surface of which drum may support matter to be exhibited.

Figure 1:
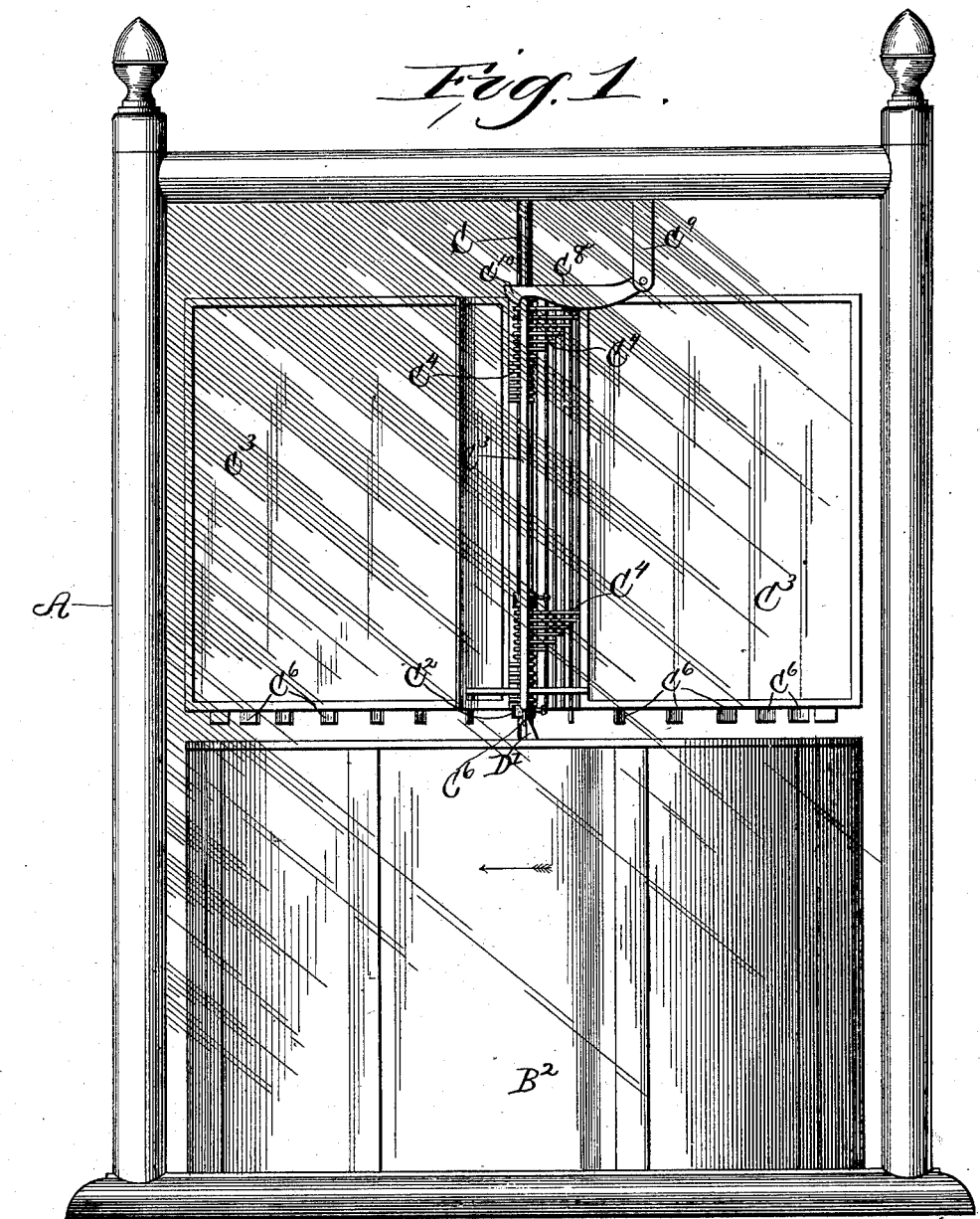
Figure 14:
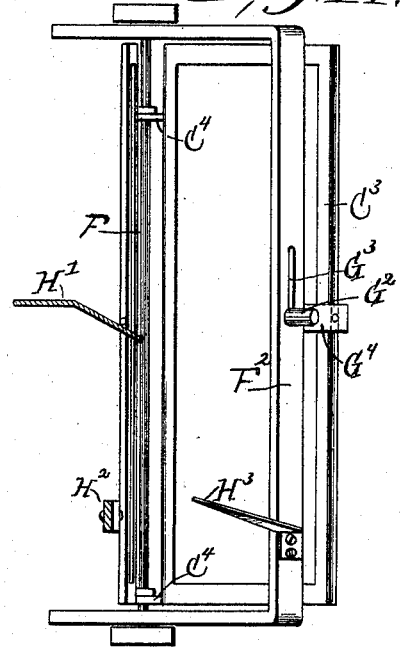
Figure 15:
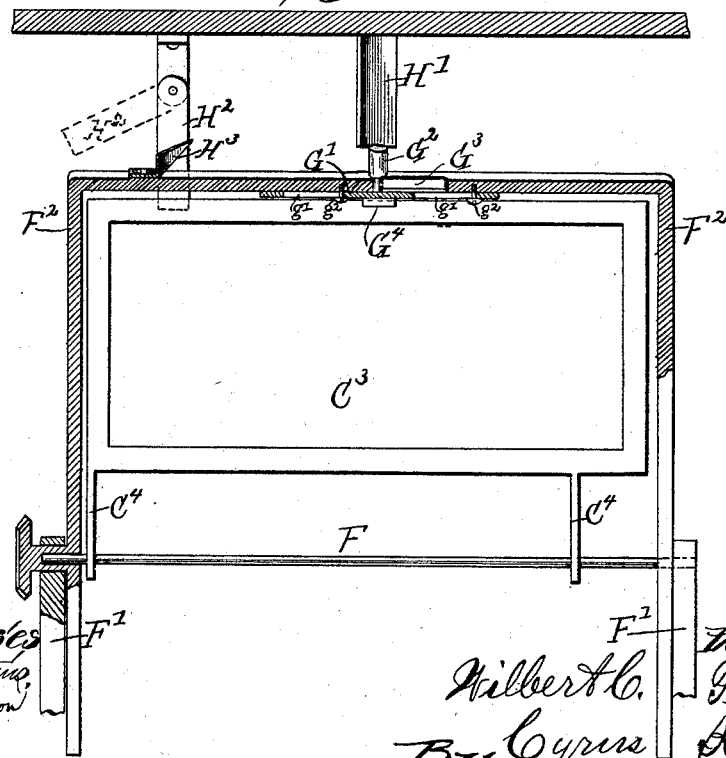

In the accompanying drawings—Figure 1 is a front elevation of an exhibiting device embodying my improvement. Fig. 2 is a vertical section of the construction shown in Fig. 1. Fig. $2^a$ is a view of a catch for holding the wings in a fixed position. Fig. $2^b$ is a detail perspective view of the wings. Figs. 3, 4, and 5 are detail views of the mechanism concerned in supporting and revolving the wings shown in Figs. 1 and 2. Fig. 6 is a detail of the finger for shifting the exhibiting wings. Fig. 7 is a detail of the driving shaft and the shaft supporting the wings. Fig. 8 illustrates a modification comprising a rotary drum located above and below a series of wings. Figs. 9, 10, 11, and 12 illustrate details of the mechanism for shifting the wings. Fig. 13 is a side elevation of a modification of my apparatus in which the wings are mounted on a horizontal axis, the side of the inclosing case being removed. Fig. 14 is a horizontal section in the line $a-b$ of Fig. 13, looking downward. Fig. 15 is a vertical section in the line $a-c$ of Fig. 13, looking toward the left.

Referring first to Figs. 1 to 7 inclusive, A is a vertical case having glass walls.

B is a vertical shaft located centrally within the lower portion of the case, A, and supported at its lower end by the bottom of said case and near its upper end by a horizontal bar, $E^2$, which bar is supported by a cam, E, to be hereinafter described. (See Fig. 2.) Said shaft is arranged to be rotated continuously by a motor, B'. Said motor may be of any well known form.

$B^2$ is a drum concentric to and surrounding the lower portion of the shaft, B, and secured rigidly to the latter by a hub, $B^3$, forming a part of the head of said drum. Said drum, as shown, has no bottom. It also incloses the motor, the cams, E, supports, E', and the trip, D, so that these parts are excluded from view, and all of the exposed portion of said drum may be covered with articles to be exhibited.

C is a shaft located in the upper portion of the case, A, axially in line with the shaft B and supported from above by a collar, C', surrounding said shaft above the top of the case, A, and secured to said shaft in any suitable manner, while the lower end of said shaft extends into the hub, $B^3$, without being secured to said hub, (see Fig. 7,) so that the lower end of said shaft C is confined against lateral movement but is free to rotate or remain stationary independent of the motion of said hub, $B^3$, and the shaft B.

$C^2$ is a collar surrounding the shaft C above the drum, $B^2$, and above said collar, arms, $C^4$, and wings, $C^3$, surround said shaft in suitable manner to support said wings parallel to said shaft and so that said wings may rotate in a circular path concentric to said shaft. Said arms, $C^4$, may be separated from each other and from the shaft C by combined washers and bushings, $c^4$, as indicated in Fig. 5. Being thus supported, said wings may be swung around said shaft C with comparative ease. It is to be noted that the only permanent contact made with said wings is through the bearings in the arms, $C^4$. Each wing has at one side a projection, $C^5$, of suitable length to make contact with the next succeeding or preceding wing and keep such wings from coming into contact face-to-face. The purpose of maintaining this separation, which need be only slight, is to insure space for a finger, $D'$, of a trip, D, to be hereinafter described, to enter between adjacent wings to the end that only one wing may be engaged by said finger at a time. Said wings may have at their edges short extensions, $C^6$, for the engagement of said finger, $D'$, or said finger may be allowed to engage the edge of each wing directly.

The number of wings, $C^3$, is preferably limited so that when they are massed as closely as may be they will occupy only the space at one side of a vertical plane extending through the shaft C, and that, when thus massed, one full side of each of two wings shall be exposed to view from the same point of sight, as indicated in Figs. 1, 2, and 3, and that one wing may stand in a plane perpendicular to said two wings, so that the sides of said last-mentioned wing shall be exposed to view from points of sight in a line parallel to said two wings and cutting said single wing.

D is a trip, of which $D'$ is a finger located within the drum, $B^2$, and extending through a slot, $b^2$, in the top of said drum into the path of the wings, $C^3$, as shown in Fig. 2. Said finger is supported by a horizontal bar, $D^2$, which bar is hinged at a point away from the finger, $D'$, to a carrier, which is in this case an arm $D^3$ extending radially from the hub, $B^3$, on the shaft B.

It is obvious from an inspection of the drawings, that an up-and-down movement of the bar, $D^2$, will cause the vertical reciprocation of the finger, $D'$. It is also obvious that, in the absence of extraneous means, said bar, $D^2$, and finger, $D'$, will move downward until said bar is substantially in a vertical position. An annular cam, E, however, sustains the arm $D^3$ in a substantially horizontal position. Said cam is supported from the floor of the case, A, by standards, $E'$, and the entire rear half of said cam is so low as to allow the end of the bar, $D^2$, which supports the finger, $D'$, to fall sufficiently to allow the latter to descend out of the path of the frames, $C^3$. A short portion of said cam at the middle of the front half thereof is also so low as to allow said bar to fall sufficiently to allow the finger, $D'$, to fall out of the path of the wings, $C^3$. To cause the bar, $D^2$, to pass over the cam, E, with a minimum of resistance, the said bar is provided with a roller, $D^4$, which rests upon said cam, and the bar, $D^2$, is provided with a weight, $D^5$, at its end at the side of the arm, $D^3$, opposite the wheel, $D^4$, and the finger, $D'$, whereby said wheel and finger are nearly counterbalanced and the reciprocation of said finger facilitated.

If the motor, $B'$, be now set into operation so as to rotate the shaft B in the direction indicated by the arrow in Fig. 2, the drum, $B^2$, the arm, $D^3$, bar, $D^2$, and finger, $D'$, will be carried around the axis of the shaft B, the roller, $D^4$, riding upon the cam, E. The end of the bar, $D^2$, supporting the finger, $D'$, will rise and fall according to the elevation or depression of said cam, and the finger, $D'$, will rise and fall correspondingly; and when said finger rises, it extends into the path of the wings, $C^3$, and carries with it any wing with which it may make contact. Figs. 1, 2, and 3 show said finger elevated and in engagement with a wing, $C^3$, which has its free end directed accurately toward the front of the case and which stands in a plane perpendicular to the plane of the foremost of the group of wings in the rear of the case. Immediately in front of the roller, $D^4$, is a short depression in the cam, E, and said roller will at once enter said depression and allow said finger, $D'$, to fall out of engagement with the wing already mentioned, so that the latter may become stationary. But, as said depression is short, the roller, $D^4$, is at once raised before it can pass the then stationary wing immediately in front of the wing just disengaged. Thus the second wing is set into motion and carried along until the finger is again allowed to fall when the roller, $D^4$, enters upon the depressed portion of the cam, E, at the side of the case. Before disengagement is effected at this latter point the last-mentioned wing makes contact with the next-preceding wing and pushes it forward through a distance equal to the total thickness of one of the wings. Then the finger, $D'$, travels idly beneath the group of wings at the rear of the case and does not again rise until the elevated portion of the cam, E, at the opposite side of the case is reached. The cam rises approximately directly below the last of the group of wings, in such position as that the finger, $D'$, is raised directly behind the said wing, to the end that the latter may be forcibly carried to the front. In so doing, the last-mentioned wing makes contact with the wing then at the front and progresses the latter through a distance equal to the total thickness of one of the wings, so that the latter will occupy the position indicated slightly at the left of the shaft B. Since the shaft C is detached from the shaft B and separately supported, it follows that the rotation of the shaft B will not directly effect the rotation of the shaft C; and each wing moves upon the shaft C with so little resistance that each such wing may be swung separately without turning the shaft C and thus turning the entire set of wings, $C^3$. In other words, each wing, $C^3$, requires less force to turn it than is required to turn the shaft C upon its support at the top of the case. Consequently, the shaft C remains stationary until the wing has been carried across the front of the case and presses against the last wing at the left of the case. Then all the wings at the rear of the case will be turned in a mass upon the shaft C or they will be turned and turn the shaft C with them through the number of degrees of the circle occupied by one wing.

In Figs. 9, 10, 11, and 12, I show a modification of the trip, D, in which the bar, $D^2$, is secured to the top of the drum, $B^2$, (which is in this case the trip carrier) by a vertical journal, $D^6$, so that said bar will oscillate in a horizontal plane, and so that the finger, $D'$, will be reciprocated in a longitudinal instead of a vertical direction. At one limit of its movement, said finger stands in the path of the lugs $C^6$, while at the other limit, said finger is out of the path of said lugs. Since this trip is hinged to move in a horizontal plane, gravity will not affect its position, but the trip will remain in any position given it until positive force is applied to change it, so that only such cams are required as are concerned in shifting the trip, no intermediate portions being needed to maintain the position.

On referring to Fig. 2, it will be seen that the cam, E, has in that figure four portions which are concerned in shifting the trip. For the same movement of the wings, in the trip shown in Figs. 9, 10, and 11, there are only three cams, $E^3$, concerned in shifting the trip. This results from the fact that the trip shown in that figure is provided with two points for making contact with said cam, one of said points being at one side of the journal, $D^6$, and the other being at the other side of said journal, $D^6$. Both of these points are rollers, $D^4$, which are identical with the roller, $D^4$, in Figs. 2, 3, and 6, excepting that they have vertical axes. Said cams, $E^3$, are virtually horizontal fingers arranged equi-distant from the central shaft, B, one at the right, one at the left, and one at the front of the machine as shown in Fig. 9. As shown in said figure, each of said fingers or cams is supported upon an arm, $E^4$, extending in a substantially horizontal direction from the central frame, $E'$. The cam, $E^3$, at the left hand side of the machine is arranged a little lower than the other two cams, in order that it may not enter into engagement with the front roller, $D^4$.

In order that the wing, $C^3$, at the front of the machine may be held positively in the desired position, a gravity stop, $C^7$ (Figs. 2 and $2^a$) may be so applied as to automatically engage said wing when the latter comes to its position and to be released when the latter is again to move.

$C^8$ is an arm hinged by its rear end to a support, $C^9$, extending downward from the upper wall of the case, A. At its free end, which is directed toward the next position of the wings, said arm has a hook, $C^{10}$, which is adapted to fall into the path of the wing and hold the latter so that it cannot progress toward the next position. Between said hook and the hinge of said arm, the latter extends downward into the path of the upper edge of the wings, $C^3$, so that the next wing when moved forward toward the front of the case will engage and lift said arm and hook, whereby the preceding and therefore stationary wing, $C^3$, is released and allowed to move forward when pressed by the next succeeding wing, $C^3$. Said arm again descends by gravity as the second wing progresses and said hook falls into the path of said second wing, whereby the progress of the latter is arrested.

In order that the drum, $B^2$, may be restrained from swaying at its lower end, guide-rollers, $A'$, are secured at the bottom of the case, A, on vertical axes in proper position to make contact with the vertical wall of the drum.

If the exterior surface of the drum, $B^2$, is not particularly desired for exhibiting, said drum and the shaft B may be shortened, or the drum, $B^2$, altogether omitted, and the cam, E, located as near the floor of the case, A, and as near the wings, $C^3$, as may be, in order that the case, A, may be shortened to approximately the height of the wings, $C^3$, or that the wings, $C^3$, may be extended downward so that their length will approximately equal the height of the case A.

If it be desired to always carry each wing from one side of the case, A, around the front to the opposite side of the case into a plane perpendicular to a line extending from a point of sight in front of the case to said wing, the short depression in the front of the cam is to be omitted. Then, manifestly, the finger, $D'$, cannot fall at such point, but will be carried in the elevated position until the side of the case is again reached.

If so desired, the downward movement of the roller, $D^4$, and the finger, $D'$, may be limited by limiting the range of movement of the bar, $D^2$, upon the arm, $D^3$, in such manner as to allow the end of the bar which supports the finger, $D'$, to descend only a sufficient distance to disengage the finger, $D'$, from the wings, $C^3$. Said hinge movement may be thus limited by placing a stop, $d^2$, (see Fig. 6) upon the side of the bar, $D^2$, at the rear of the arm, $D^3$, rearward adjacent to the face of the arm, $D^3$, at a point far enough below the projection, $d'$, to make contact with the latter when the finger, $D'$, has descended far enough for disengagement with the wings, $C^3$. Then only the elevated portions of the cam, E, will be required.

The arm, $D^3$, may be dispensed with and the bar $D^2$ supported directly from the drum $B^2$.

It is to be noted that the finger which I have thus described by reference to Figs. 1 to 7 inclusive, is a traveling finger arranged to travel in a path which is substantially annular and substantially concentric to the axis of the exhibiting wings, and that the mechanism is located along said path for at suitable intervals shifting said finger into and out of the path of said wings.

In Figs. 13, 14, and 15, the construction embodies a horizontal, central shaft, F, supported in uprights, $F'$, rising from the bottom of the case, A. Wings, $C^3$, similar to the wings, $C^3$, in the preceding figures, are applied loosely to this shaft by arms, C⁴, so that said wings are adapted to revolve around a horizontal axis which is common to the axis of the shaft, F. When left to themselves, the wings, C³, turn by gravity upon the shaft, F, until they rest against each other in the lower portion of the case, as indicated in Fig. 13.

L indicates an opening in one of the vertical walls of the case parallel to the shaft, F. Said opening may or may not contain a magnifying lens, and said opening is located at such height as to be opposite the middle of a wing, C³, when the latter is in the vertical position above the shaft, F, so that one side of said wing may be viewed through said opening when said wing is elevated, as mentioned. In this construction, the office of the trip, G, is to engage and carry the uppermost wing at one side of the case upward and across one portion of the case and let it rest in the substantially horizontal position at the opposite side of the case. This may be done slowly and the picture or other article supported by the wing viewed while the latter is in motion, or the wings may be arrested and temporarily held stationary in the vertical position, as indicated in Fig. 13.

F² is the trip carrier, which is, in this case, a yoke extending around the space traversed by the wings, C³, and supported by the uprights, F′, concentric to the shaft, F, and arranged to rotate independently of the shaft, F. The arms of the yoke may extend beyond the shaft, F, so as to counterbalance the body of said yoke. At one side of said yoke, a trunnion, F³, may extend from said yoke around the shaft, F, through the adjacent standard, F′, and there support a bevel-gear, F⁴, the rotation of which will cause the yoke to revolve around the entire mass of wings, C³.

G is a trip of the same general character as the two forms already described. The bar, G′, is applied to the middle of the yoke, F², at the side of the latter which is toward the shaft, F, and is provided with longitudinal slots, g′, through which screws, g², extend loosely into the yoke, F², so that said plate may be shifted back-and-forth on said yoke in a direction parallel to the shaft, F. Any other suitable means for allowing the longitudinal movement of this plate, G′, may be used. A post, G², extends upward through a slot, G³, in the yoke, F², from the plate, G′, so that the reciprocation of said post in a direction parallel to the shaft, F, will cause the reciprocation of the plate, G′, in a similar direction. The plate, G′, supports a cross-bar, G⁴, which is turned down at the rear end to constitute a finger, g⁴. By the reciprocation of the plate, G′, said finger, g⁴, is carried into and out of the path of the extension, C⁶, on the wings, C³.

H is a stationary cam located horizontally opposite the shaft, F, just outside of the path of the yoke, F², and at the side of the shaft, F, from which the wings, C³, are to be lifted. The lower portion of said cam is located toward the rear of the machine, as viewed in Fig. 13, and when the yoke, F², is approaching said cam from the lower portion of said case, said trip stands at its rear limit of movement, and the post, G², is moving in the path extending through said cam, H, so that said post will make contact with said cam and be shifted forward and the finger, g⁴, carried into engagement with the extension, C⁶, on the uppermost wing, C³, at that side of the case. Thus said wing is lifted by said vertical trip and carried upward into the vertical position. Above the path of the yoke, F², and secured to the lower face of the upper wall of the case, A, is another stationary cam, H′, having the rearmost portion of its face toward the left of the apparatus, as indicated in Figs. 13, 14, and 15. Said cam stands in the path of the post, G², and the latter will, as it approaches said cam, be engaged by said cam and thrown forward. By this means the trip is shifted forward and the finger, g⁴, shifted laterally out of engagement with the extension, C⁶, of the wing, C³, being then carried by the trip. The parts concerned in this operation are so spaced and located as that said trip is shifted and the wing just raised released upon being carried a little beyond the vertical position, so that it will by gravity tend to move forward toward the left of the case. Here it is met and arrested by the pendant, H², which is supported from the top of the case, A, in such manner as to allow it to be swung laterally into a plane parallel to the shaft, F. The free end of said pendant extends downward just far enough to lead into the path of the wings, C³, thus making a stop for said wings. It is obvious that swinging the lower end of said pendant laterally will raise said end out of engagement with said wing and allow the latter to fall toward the left of the case in a substantially horizontal position. This is accomplished just before or simultaneously with the release of the next-succeeding wing by the trip, G. For this purpose, a cam, H³, is mounted upon the yoke, F², so as to have a path extending through the pendant and upon the advance of said cam, H³, the forward end of the latter will engage the rear edge of said pendant and crowd the latter forward and upward until said pendant is above the edge of the wing, C³, then in engagement with said pendant. As soon as said cam, H³, has passed, said pendant falls by gravity into the vertical position, so that said pendant is again in the path of the wings, C³. The relative position of the parts involved is such as to cause this to occur before the next succeeding wing can pass said pendant. Thus one wing, C³, is released by said pendant and the next succeeding wing engaged by said pendant and arrested until the yoke, F², again comes around, when another wing, C³, is lifted from the substantially horizontal position at the right of the machine and carried up into the vertical axis of the machine.

For the purpose of enlarging views on the wings $C^3$, lenses, I, may be located in the walls of the case, A. In Fig. 8, such lenses are placed opposite the wing, $C^3$, which is directed toward the front of the apparatus, so that one of said lenses will command a view of one side of said wing and the other will command a view of the other side of said wing. In Fig. 13, a lens is placed in line with the upright wing opposite one side of the latter, while at the other side there is located a light, J, out of the path of the wings, $C^3$, and behind a ground glass, J', and in front of a deflector, $J^2$. To aid in diffusing the light, a piece of glass, $J^3$, having non-parallel sides or having ground surfaces may be placed near the light at the side of the latter toward said wing. Said light serves to illumine transparent views in the wings, $C^3$, when the latter are in the vertical position.

I claim as my invention—

1. In an exhibiting apparatus, the combination of a series of wings hinged in the same axial line and restricted in number so that substantially all of said wings may be at one side of a plane extending through said axial line, a trip carrier arranged to move around said axial line adjacent to said wings, a movable trip attached to said carrier, and a cam at each side of said axial line and in or adjacent to said plane, one for moving said trip into and the other for moving said trip out of engagement with said wings, and a cam in a line perpendicular to said plane and at the side of the latter opposite the larger number of said wings, said last-mentioned cam being adapted to effect the movement of said trip out of the path of said wings, substantially as shown and described.

2. In an exhibiting apparatus, the combination of a series of wings hinged in the same axial line and restricted in number so that substantially all, of said wings may be at one side of a plane extending through said axial line, a trip carrier arranged to move around said axial line adjacent to said wings, a movable trip attached to said carrier, and a cam at each side of said axial line and in or adjacent to said plane, one for moving said trip into and the other for moving said trip out of engagement with said wings, and a stop $C^7$ located in the same radial plane with the last-mentioned cam, substantially as shown and described.

3. In an exhibiting apparatus, the combination of a rotatable shaft, wings $C^3$ hinged to said shaft, a rotatable drum axially in line with said shaft and of proper diameter and depth to afford upon its exterior a suitable surface for bearing display matter, a trip supported by said drum adjacent to said wings, and cams for moving said trip into and out of engagement with said wings, substantially as shown and described.

4. In an exhibiting apparatus, the combination of a rotatable shaft, wings $C^3$ hinged to said shaft, a rotatable drum axially in line with said shaft and of proper diameter and depth to afford upon its exterior a suitable surface for bearing display matter, a trip supported by said drum adjacent to said wings, cams for moving said trip into and out of engagement with said wings, and a motor arranged to rotate said drum, substantially as shown and described.

5. In an exhibiting apparatus, the combination of a rotatable shaft, wings hinged to said shaft, a rotatable drum axially in line with said shaft, a trip supported by located within and by extending through said drum adjacent to said wings, and cams located within said drum and arranged to move said trip into and out of engagement with said wings, substantially as shown and described.

6. In an exhibiting apparatus, the combination of a vertical, rotatable shaft, wings hinged to said shaft, a rotatable drum axially in line with said shaft, a trip supported by located within and by extending through said drum adjacent to said wings, and cams located within said drum and arranged to move said trip into and out of engagement with said wings, substantially as shown and described.

7. In an exhibiting apparatus, the combination of a vertical, rotatable shaft, a support suspending said shaft at the upper end of the latter, a vertical shaft located beneath the first-mentioned shaft, a trip carrier supported by the second mentioned shaft, a movable trip supported by said trip carrier adjacent to said wings, and cams for moving said trip into and out of engagement with said wings, and a motor for rotating said second-mentioned shaft, substantially as shown and described.

8. In an exhibiting apparatus, the combination of a shaft C, a support loosely suspending said shaft at the upper end of the latter, a series of wings hinged to said shaft C, a vertical, rotatable shaft B located beneath the shaft C and having a hub at its upper end into which the lower end of the shaft C loosely extends, a trip carrier supported by said shaft B, a trip supported by said trip-carrier adjacent to said wings, and cams located adjacent to said trip to move the latter into and out of engagement with said wings, substantially as shown and described.

9. In an exhibiting apparatus, the combination of a vertical, rotatable shaft, wings $C^3$ hinged to said shaft, a rotatable drum axially in line with said shaft, a trip supported by said drum adjacent to said wings, cams for moving said trip into and out of engagement with said wings, and a motor arranged within and to rotate said drum, substantially as shown and described.

10. In an exhibiting apparatus, the combination of a rotatable shaft, wings, $C^3$, hinged to said shaft, a rotatable drum axially in line with said shaft at one end of said group of wings, a drum located at the other end of said group of wings and also axially in line with said shaft, supports extending from said first-mentioned drum to said second-mentioned drum outside of the path of said wings, and mechanism for moving said wings one at a time around said shaft simultaneously with said drums, substantially as shown and described.

In testimony whereof I affix my signature, in presence of two witnesses, this 15th day of December, in the year 1891.

WILBERT C. FAWKES.

Witnesses:
AMBROSE RISDON,
FRANK L. STEVENS.